US009909569B2

(12) United States Patent
Hammerum et al.

(10) Patent No.: US 9,909,569 B2
(45) Date of Patent: Mar. 6, 2018

(54) TILTING WIND TURBINE

(71) Applicant: Vestas Wind Systems AS, Aarhus N (DK)

(72) Inventors: Keld Hammerum, Hadsten (DK); Elk Herbsleb, Odder (DK); Lars Finn Sloth Larsen, Sydals (DK); Fabio Caponetti, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 328 days.

(21) Appl. No.: 14/417,207

(22) PCT Filed: Jul. 26, 2013

(86) PCT No.: PCT/DK2013/050254
§ 371 (c)(1),
(2) Date: Jan. 26, 2015

(87) PCT Pub. No.: WO2014/015882
PCT Pub. Date: Jan. 30, 2014

(65) Prior Publication Data
US 2015/0167646 A1    Jun. 18, 2015

Related U.S. Application Data

(60) Provisional application No. 61/675,886, filed on Jul. 26, 2012.

(51) Int. Cl.
*F03D 13/25* (2016.01)
*F03D 11/04* (2006.01)
(Continued)

(52) U.S. Cl.
CPC ............ *F03D 11/045* (2013.01); *B63B 39/00* (2013.01); *F03D 7/0224* (2013.01); *F03D 13/20* (2016.05);
(Continued)

(58) Field of Classification Search
CPC ........ F03D 11/045; F03D 13/25; F03D 13/22; F03D 13/20; F03D 7/0224; F03D 7/0208;
(Continued)

(56) References Cited

U.S. PATENT DOCUMENTS 4,342,539 A * 8/1982 Potter .................. F03D 7/06
416/132 B
7,456,515 B2 * 11/2008 Nielsen ................ B63B 21/502
290/55
(Continued)

FOREIGN PATENT DOCUMENTS

DE    2916878 A1 * 11/1980   ........... F03D 7/0216
EP    2472105 A2    7/2012
(Continued)

OTHER PUBLICATIONS

English translation of DE 2916878 A1, translated by Espacenet.*
(Continued)

*Primary Examiner* — Woody Lee, Jr.
*Assistant Examiner* — Behnoush Haghighian
(74) *Attorney, Agent, or Firm* — Patterson + Sheridan, LLP

(57) ABSTRACT

The preset invention relates to wind turbines and, in particular inclining a wind turbine from the vertical position. A tower (102) of a wind turbine may be inclined from the vertical position in order to reduce the loads on the tower (102).

18 Claims, 8 Drawing Sheets

(51) Int. Cl.
  *F03D 7/02* (2006.01)
  *F03D 13/20* (2016.01)
  *B63B 39/00* (2006.01)
(52) U.S. Cl.
  CPC ............ *F03D 13/22* (2016.05); *F03D 13/25* (2016.05); *F05B 2240/912* (2013.01); *F05B 2240/91521* (2013.01); *F05B 2240/93* (2013.01); *F05B 2250/40* (2013.01); *Y02E 10/723* (2013.01); *Y02E 10/727* (2013.01); *Y02E 10/728* (2013.01)
(58) Field of Classification Search
  CPC .... F03D 7/0264; F03D 7/0204; F03D 7/0212; F03D 7/0268; F05B 2250/40; F05B 2240/912; F05B 2240/93
  USPC .................................................. 416/148, 41
  See application file for complete search history.

(56) References Cited

U.S. PATENT DOCUMENTS

| | | | |
|---|---|---|---|
| 7,891,939 B1 | 2/2011 | Zuteck | |
| 8,022,566 B2* | 9/2011 | Loh | F03D 7/0224 290/44 |
| 8,366,389 B2* | 2/2013 | Hoffmann | F03D 7/0224 416/1 |
| 2011/0148115 A1* | 6/2011 | Roznitsky | F03D 1/001 290/44 |
| 2011/0262272 A1* | 10/2011 | Nies | F03D 80/70 416/1 |
| 2012/0171034 A1* | 7/2012 | Gabeiras | F03D 7/0204 416/1 |
| 2013/0302139 A1* | 11/2013 | Wittrisch | F03D 7/0204 415/14 |
| 2014/0339828 A1* | 11/2014 | Peiffer | F03D 7/048 290/44 |

FOREIGN PATENT DOCUMENTS

| | | | | |
|---|---|---|---|---|
| WO | 03/004869 A1 | 1/2003 | | |
| WO | WO 2013093124 A1 * | 6/2013 | ............... | F03D 1/00 |

OTHER PUBLICATIONS

English translation of WO 2013093124 A1, translated by WIPO.*
International Search Report for PCT/DK2013/050254, dated Oct. 25, 2013.

* cited by examiner

TILTING WIND TURBINE

The present invention relates to tilting wind turbines and in particular to inclining wind turbines from a vertical position.

Wind turbines effectively harness wind energy to generate electrical power and are becoming increasingly popular as an alternative energy source to the traditional sources for generating electrical power. Harnessing wind energy is considered to be a cleaner more sustainable source for the generation of electrical power.

In order to generate electrical power from wind energy, wind turbines 101 typically comprise a tower 102 that is based on a stable foundation 103, a nacelle 104 located on the tower 102 to house the electrical and mechanical apparatus, such as the generator, and a rotor 105 with one or more turbine blades 106 connected to the nacelle as shown in FIG. 1. In basic and simplistic terms, the turbine blades are rotated by the incident wind energy which drives a generator to produce electrical power.

A wind turbine is expensive to manufacture and therefore a key driver in developing wind turbines is the need to reduce the cost of a wind turbine to make wind turbines an economical solution to generating electrical power.

The present invention seeks to address, at least in part, the needs and disadvantages described hereinabove.

According to a first aspect of the present invention there is provided a wind turbine comprising: a foundation; and a tower connected to the foundation wherein the tower is inclined from a vertical position to reduce loads on the tower.

The loads on a wind turbine tower may be advantageously reduced by inclining the tower from a vertical position.

The tower may be inclined to a predetermined tilt angle into a predominant wind direction. The predominant wind direction may be determined based on an analysis of wind conditions at a location of the wind turbine. The predetermined tilt angle may be determined based on an analysis of wind conditions at a location of the wind turbine.

The location at which the wind turbine may be erected may be analyzed, for example, by determining a wind rose. The wind rose may show the wind direction and/or wind speeds at the location and can be identified from sensor readings, e.g. from a Met-Mast that has been at the location for a predetermined amount of time, e.g. one year or any other suitable time period to obtain an indication of the wind direction and speed at the location. Other site conditions may also be measured at the location, e.g. wind turbulence, temperature, air density, and so on. Based on at least the wind rose information the predominant wind direction can be identified and the wind turbine tower can be inclined from a vertical position into the predominant wind direction. The tilt angle for the inclination of the tower may be set at a specific value, e.g. 1 degree to 2 degrees, or may be predetermined based on the wind speed and/or wind direction such that the reduction in loads on the tower is proportional to the inclination of the tower into the predominant wind direction. The tower may then be inclined from the vertical position by the predetermined tilt angle.

The foundation may be a fixed foundation, e.g. a solid foundation into the Earth. The foundation may be a floating platform for an offshore wind turbine.

The tower may be fixedly inclined to the predetermined tilt angle such that the tower may be permanently inclined from the vertical position. Therefore, the wind turbine may be erected with a permanent inclination from the vertical position into the dominant wind direction in order to reduce the loads on the tower of the wind turbine.

The wind turbine may further comprise a device operatively connected to the tower, wherein the device enables the tower to tilt around one or more axes and the tower is connected to the foundation by the device. The device enables the wind turbine tower to rotate or tilt around one or more axes in order to incline the tower from the vertical position. The advantage of enabling the tower to rotate or tilt around one or more axis is that irrespective of the wind direction the loads on the tower may be reduced by inclining the tower from the vertical position into the current wind direction.

The device may be one or more of a hinge, a platform, a flexible member, a joint, and a ball and socket.

The wind turbine may further comprise one or more safety devices, wherein the safety device may prevent the wind turbine from tilting further than a predetermined tilt angle.

The wind turbine may further comprise a controller adapted to determine a tilt angle for the wind turbine; and the controller is further adapted to alter an operating parameter of the wind turbine such that the wind turbine inclines to the determined tilt angle at which the wind turbine is balanced between a thrust force acting on the wind turbine and gravity acting on the wind turbine.

The controller may be further adapted to determine an optimal tilt angle wherein the optimal tilt angle provides optimal electrical power production by the wind turbine.

The controller may be further adapted to identify the tilt angle from a lookup table; or calculate the tilt angle in real time.

The controller may be further adapted to determine a pitch angle for one or more turbine blades of the wind turbine based on the determined tilt angle; and/or determine a generator torque for a generator of the wind turbine based on the determined tilt angle.

The controller may be further adapted to identify a current tilt angle of the wind turbine; determine a difference between the current tilt angle and the determined tilt angle; and alter the operating parameters of the wind turbine based on the determined difference.

The controller may be, or include, one or more of a processor, memory, inputs, outputs, and so on, so that the controller may perform the functions and features of the aspects of the invention.

According to a second aspect of the present invention there is provided a method comprising: inclining a tower of a wind turbine such that the tower is inclined from a vertical position to reduce loads on the tower.

The method may further comprise determining a predominant wind direction; and inclining the tower by a predetermined tilt angle into the predominant wind direction.

The method may further comprise determining the predetermined tilt angle based on an analysis of wind conditions at a location of the wind turbine.

The method may further comprise determining a tilt angle for the wind turbine; and altering an operating parameter of the wind turbine such that the wind turbine inclines to the determined tilt angle and the wind turbine is balanced between a thrust force acting on the wind turbine and gravity acting on the wind turbine.

Determining the tilt angle may further comprise determining an optimal tilt angle wherein the optimal tilt angle provides optimal electrical power production by the wind turbine.

Determining the tilt angle may further comprises identifying the tilt angle from a lookup table; or calculating the tilt angle in real time.

Altering the operating parameter of the wind turbine may further comprise determining a pitch angle for one or more turbine blades of the wind turbine based on the determined tilt angle; and/or determining a generator torque for a generator of the wind turbine based on the determined tilt angle.

The method may further comprise identifying a current tilt angle of the wind turbine; determining a difference between the current tilt angle and the determined tilt angle; and the altering of the operating parameters of the wind turbine is based on the determined difference.

According to a third aspect of the present invention there is provided a method for controlling a wind turbine comprising the steps of: determining a tilt angle for the wind turbine; and altering an operating parameter of the wind turbine such that the wind turbine inclines to the determined tilt angle and the wind turbine is balanced between a thrust force acting on the wind turbine and gravity acting on the wind turbine.

The method may be implemented by a controller which may be a controller already part of a wind turbine or may be a separate controller. The controller may include any number of processors, memory, inputs/outputs in order to implement the method.

A tilt angle may be determined for a wind turbine where the tilt angle may be one angle at which the wind turbine can be inclined to such that the wind turbine can be balanced between a thrust force acting on the wind turbine caused by the incident wind and gravity acting on the wind turbine. One or more operating parameters of the wind turbine can be altered in order to incline the wind turbine at the determined tilt angle.

The step of altering the operating parameters may include directly altering the operating parameters or initiating/instructing one or more other controllers or systems to alter or change the operating parameter(s).

The step of determining the tilt angle may further comprise the step of determining an optimal tilt angle wherein the optimal tilt angle provides optimal electrical power production by the wind turbine. There may be more than one tilt angle at which the wind turbine can be balanced or in equilibrium between the thrust force and gravity acting on the wind turbine.

Also, by altering the operating parameter of the wind turbine (e.g. a pitch angle of one or more turbine blades) by differing amounts then there may be achieved different tilt angles at which the wind turbine may be balanced between the thrust force and gravity.

Therefore, the controller may determine the optimal tilt angle for the wind turbine such that the optimal electrical power is generated or output by the wind turbine. The optimal tilt angle may be determined based on at least the wind speed. The wind speed may be measured or estimated. The measured wind speed may be taken at the wind turbine or upstream of the wind turbine and may be measured using sensors such as an anemometer, or a Light Detecting and Ranging (LiDAR) device. The sensor may be located at the wind turbine or separate to the wind turbine. The wind speed may be estimated or inferred, for example, from electrical power output of the wind turbine, rotor speed and so on.

The step of determining the tilt angle may further comprise identifying the tilt angle from a lookup table; or calculating the tilt angle in real time.

The step of altering the operating parameter of the wind turbine may further comprise the steps of determining a pitch angle for one or more turbine blades of the wind turbine based on the determined tilt angle; and/or determining a generator torque for a generator of the wind turbine based on the determined tilt angle.

Accordingly, the operating parameters that may be changed may include the pitch angle of the turbine blades and/or the generator torque of the generator in the wind turbine.

The method may further comprise the steps of identifying a current tilt angle of the wind turbine; determining a difference between the current tilt angle and the determined tilt angle; and the step of altering the operating parameters of the wind turbine is based on the determined difference.

Accordingly, the tilt angle of the wind turbine may be measured and/or tracked such that a difference between the current tilt angle and the required tilt angle can be determined. The current tilt angle of the wind turbine may be measured, estimated or inferred from sensors, such as strain gauges, inclinometers, accelerometers, attached to or located in the wind turbine. The current tilt angle may be measured, estimated or inferred from sensors or devices separate to the wind turbine such as a camera system, infrared system, and so on.

The method may further comprise a supervisor. The supervisor may limit the alteration in operating parameters to further enhance the stability of the tilting wind turbine. The supervisor may set or enforce limits, either constantly or under certain operating conditions (e.g. high wind speeds, low wind speeds, and so on), to prevent the wind turbine from effectively oscillating or falling over.

The method may further include operating the wind turbine in a motor mode. The motor mode effectively turns the wind turbine into a fan. Therefore, by operating the wind turbine in a motor mode the wind turbine may be further stabilized or used as a safety mechanism to prevent or recover from tilting too far in any one direction. The operating parameter or the generator torque may be altered in order to change the wind turbine into a motor mode.

According to a fourth aspect of the present invention there is provided a controller comprising: a first processor adapted to determine a tilt angle for the wind turbine; and a second processor adapted to alter an operating parameter of the wind turbine such that the wind turbine inclines to the determined tilt angle and the wind turbine is balanced between a thrust force acting on the wind turbine and gravity acting on the wind turbine.

According to a fifth aspect of the present invention there is provided a controller adapted to determine a tilt angle for the wind turbine; and alter an operating parameter of the wind turbine such that the wind turbine inclines to the determined tilt angle and the wind turbine is balanced between a thrust force acting on the wind turbine and gravity acting on the wind turbine.

The first processor may be further adapted to determine an optimal tilt angle wherein the optimal tilt angle provides optimal electrical power production by the wind turbine.

The first processor may be further adapted to identify the tilt angle from a lookup table; or calculate the tilt angle in real time.

The second processor may be further adapted to determine a pitch angle for one or more turbine blades of the wind turbine based on the determined tilt angle; and/or determine a generator torque for a generator of the wind turbine based on the determined tilt angle.

The controller may further comprise a third processor adapted to identify a current tilt angle of the wind turbine; a fourth processor adapted to determine a difference between the current tilt angle and the determined tilt angle; and the second processor is further adapted to alter the operating parameters of the wind turbine based on the determined difference.

The first processor through fourth processor may be the same processor, different processors, or any combination thereof. The controller may comprise any hardware, software or any combination thereof to implement any or all of the features or functions of the present invention.

According to a sixth aspect of the present invention there is provided a computer program product comprising computer readable executable code for: determining a tilt angle for the wind turbine; and altering an operating parameter of the wind turbine such that the wind turbine inclines to the determined tilt angle and the wind turbine is balanced between a thrust force acting on the wind turbine and gravity acting on the wind turbine.

The computer program product may comprise computer readable executable code of implementing any or all of the features and functions of the present invention.

According to a seventh aspect of the present invention there is provided a wind turbine comprising: a tower; a nacelle; one or more turbine blades attached to a rotor that is attached to the nacelle; and a device operatively connected to the tower, wherein the device enables the tower to tilt around one or more axes.

The device may be one or more of a hinge, a platform, a flexible member, a joint, and a ball and socket.

The wind turbine may further comprise one or more safety devices, wherein the safety device prevents the wind turbine from tilting further than a predetermined tilt angle.

Embodiments of the present invention will now be described, by way of example only, and with reference to the accompanying drawings in which.

Figure 1:
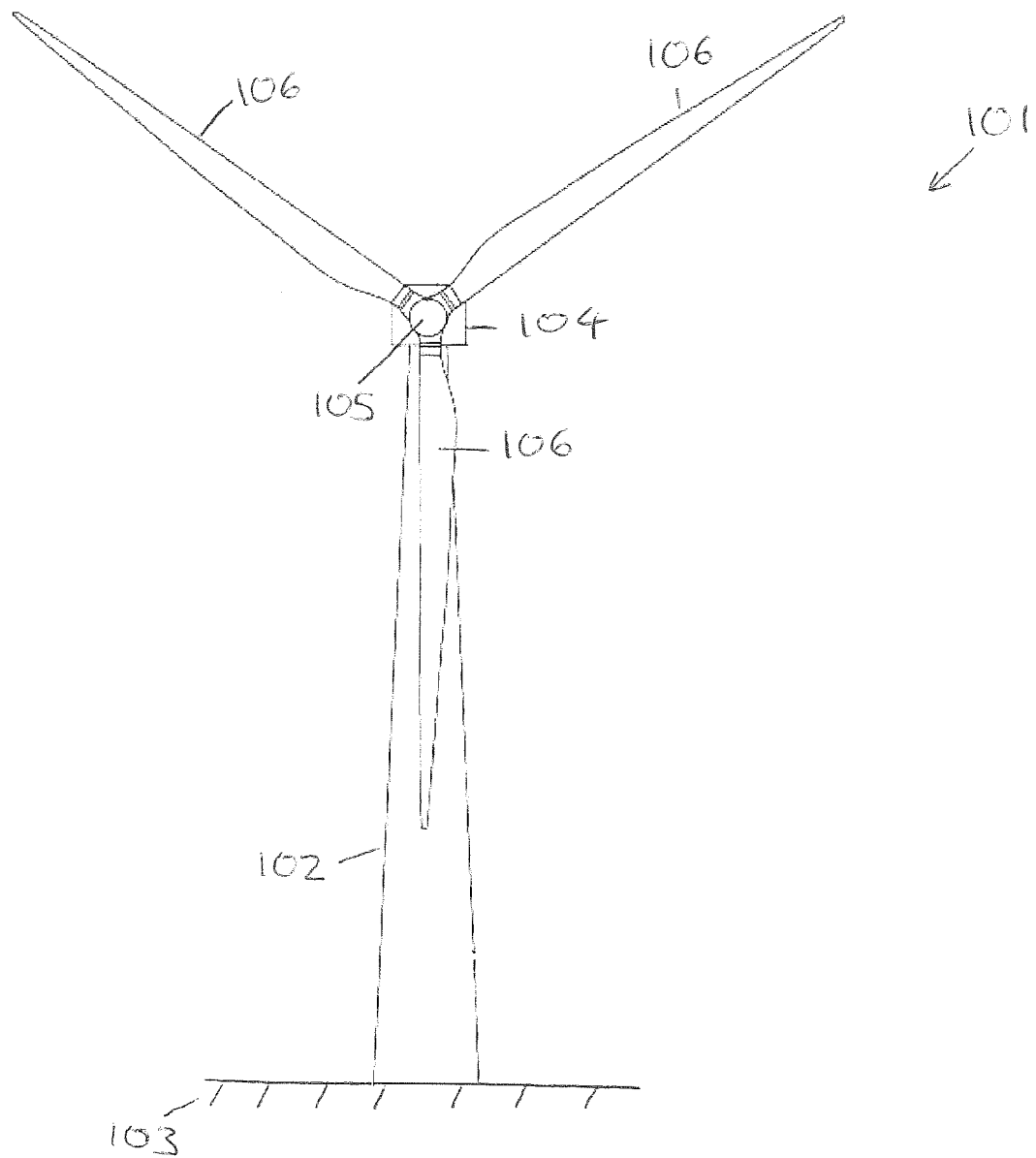
FIG. 1 shows a simplified diagram of a wind turbine.

As described hereinabove, a wind turbine typically comprises a tower 102 that is based on a stable foundation 103, a nacelle 104 located on the tower 102 to house the electrical and mechanical apparatus, such as the generator, and a rotor 105 with one or more turbine blades 106 connected to the nacelle 104.

In operation, the force of the incident wind energy on the turbine blades 106 causes the rotor to rotate and also causes a thrust force on the wind turbine 101 which effectively pushes the wind turbine 101 backwards. As such, the tower 102 is designed and manufactured to withstand the thrust forces that act on the wind turbine 101. The cost of the tower 102 is a significant proportion of the cost of the wind turbine 101 and as such if the costs of the tower 102 can be reduced then the cost of the wind turbine will also be reduced.

The main cost in manufacturing the tower 102 is in making the tower 102 strong enough to withstand the thrust forces acting on the tower 102. The thrust force effectively pushes the wind turbine backwards creating moments on the tower 102 and in particular in the base of the tower 102. Therefore, if the moments experienced by the tower 102 can be reduced then the tower 102 may be designed to include less material which in turn may reduce the costs of the tower making the wind turbine 101 more economical.

It has been identified that the moments experienced by the tower 102 can be reduced by advantageously leaning the tower 102 into the wind direction. The tower 102 can be leant into the wind by a fixed foundation, by a device that enables the tower 102 to rotate or tilt about one or more axis, or by a combination of fixing or holding the device that enables the tower 102 to tilt or rotate for a period of time and releasing the device to enable the tilting or rotating of the tower 102 for other periods of time which may be dependent on the conditions (e.g., wind conditions) or operation of the wind turbines.

Thus, the present invention advantageously enables the tower to lean into at least the main or strongest the wind direction in order to reduce the moments on the base of the tower 102.

Figure 6:
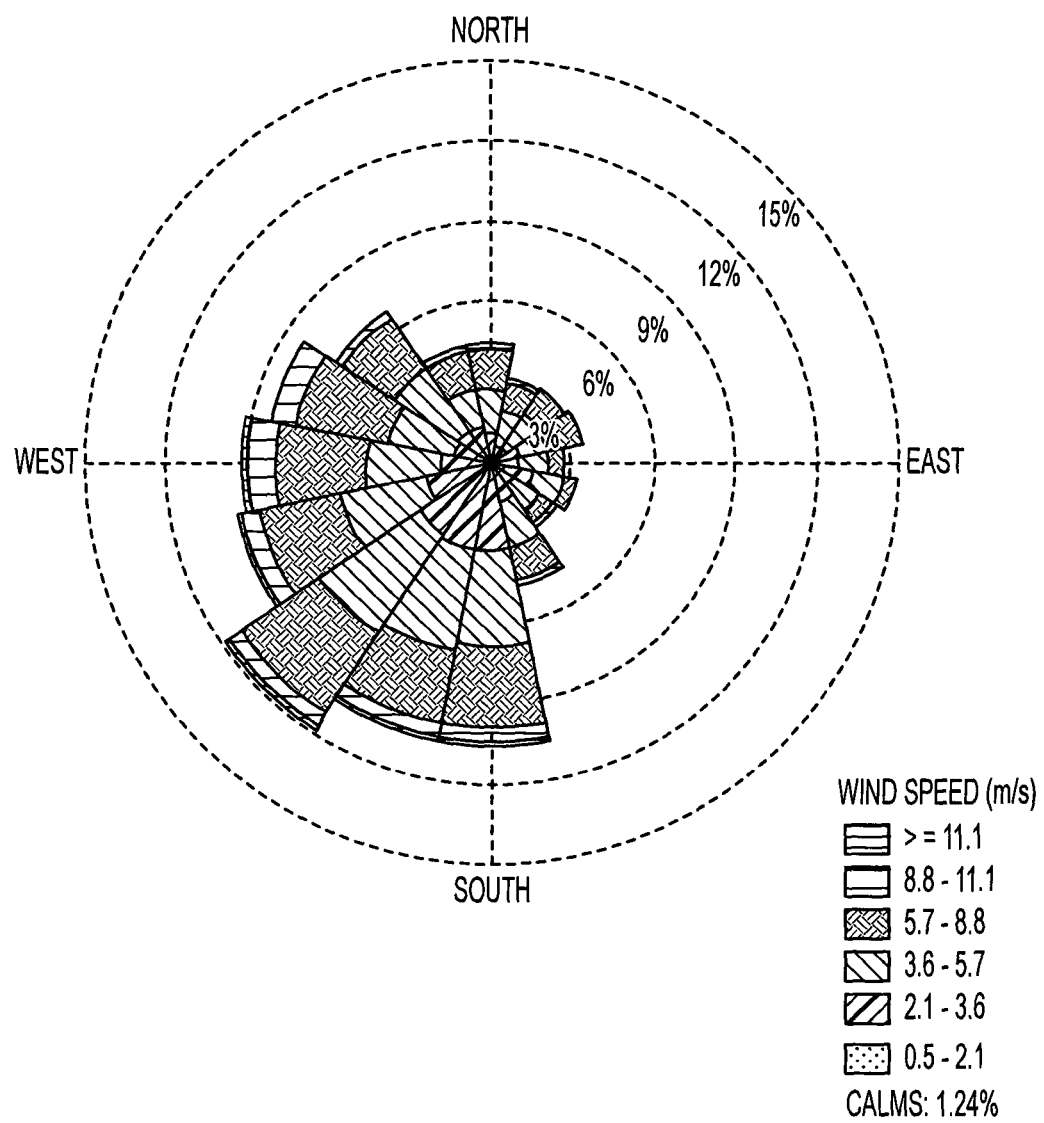
FIG. 6 shows an example wind rose according to many embodiments of the present invention.

The site or location of a Wind Power Plant (WPP) is typically analyzed and surveyed prior to the erection of one or more wind turbines to form the WPP at the desired location. As part of the analysis, it may be useful to determine a so-called wind rose of the site which may be obtained via a Met-Mast. An example wind rose for a specific site is shown in FIG. 6. As will be appreciated, the wind rose is site specific and therefore different wind rose patterns would be expected for each site. The wind rose may be determined or identified for a whole site, for different areas of the site, which may be dependent on the terrain/site conditions, for groups of proposed wind turbine locations, or for any other purpose.

As can be seen from the example wind rose of FIG. 6, the wind direction and wind speed is asymmetric at this site. Moreover, the wind speed and direction is significantly greater and predominantly from the southwest quadrant with the peak wind speed and wind direction present in the South-West direction. As the wind direction and wind speed in this example is biased towards the southwest quadrant then the moments on the base of the tower will be significantly greater from the wind in this direction than the other directions.

Figure 7:
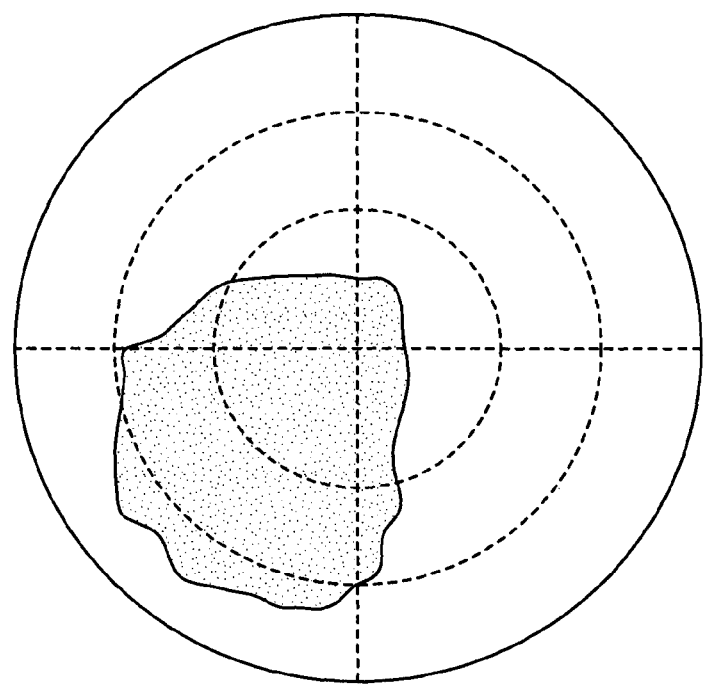
FIG. 7 shows an example tower bottom moment load envelope corresponding to the wind rose of FIG. 6.

FIG. 7 shows an example tower bottom moment load envelope that a tower may experience when subjected to the asymmetric wind rose shown in FIG. 6. As can be seen from FIG. 7, the moment loads on the bottom of the tower is greater in the southwest quadrant as this is the predominant wind direction and speed that will affect the wind turbine when placed at this location.

However, wind turbine towers typically have to be manufactured sufficiently strong to withstand all the forces, moment loads and/or fatigue loads that it may experience during its lifetime, typically 20 years. Accordingly, the tower will have to be manufactured with sufficient material and strength to withstand the peak moment loads and fatigue loads that it will experience in the southwest quadrant in this example, even though the moment loads and fatigue loads in the other quadrants of the tower bottom moment load envelope is significantly less.

Therefore, it has been identified that the moment loads and/or fatigue loads on the bottom of the tower, e.g. the tower base, can be reduced by advantageously leaning or inclining the wind turbine tower into the predominant wind direction and/or wind speed.

Based on the wind rose for the specific site, the example wind rose is shown in FIG. 7, it is determined or identified that the predominant wind direction and speed is from the South-West. Therefore, in order to advantageously reduce the moment loads and/or fatigue loads on the tower base the tower structure may be inclined or tilted towards the predominant wind direction and/or wind speed based on at least the determined wind rose. A reduction in the moment loads and/or fatigue loads experienced by the tower base may be proportional to the inclination of the tower into the predominant wind direction and/or wind speed. In this example, based on the determined wind rose a predetermined tilt angle for the inclination of the tower is determined to be 1 degree from the vertical position. As will be appreciated, the value of the predetermined tilt angle for inclination may be dependent on the value and/or size of the predominant wind direction and/or wind speed and the tower will be inclined or tilted into the direction of the predominant winds at the location of the wind turbine. It will also be appreciated that the predetermined tilt angle may be a set value, e.g. 1 degree or 1.5 degrees, and so on, where the tower is inclined to the set value and the wind rose analysis may be used to determine the direction of the inclination of the tower. The value of the predetermined tilt angle for the inclination of the tower may range from 0.5 degrees to 5 degrees and preferably between 1 degree and 2 degrees.

The tower may be inclined to the required inclination or tilt angle by installing a normal solid tower foundation and incorporating flanges into the base of the tower which are designed with the required inclination. This advantageously enables a fixed foundation tower to incline into the predominant wind based on the wind rose analysis of the site or location of the wind turbine. The inclined flanges could also be used on a floating wind turbine to tilt or incline the wind turbine into the predominant wind direction and/or speed for an offshore wind turbine.

Figure 8:
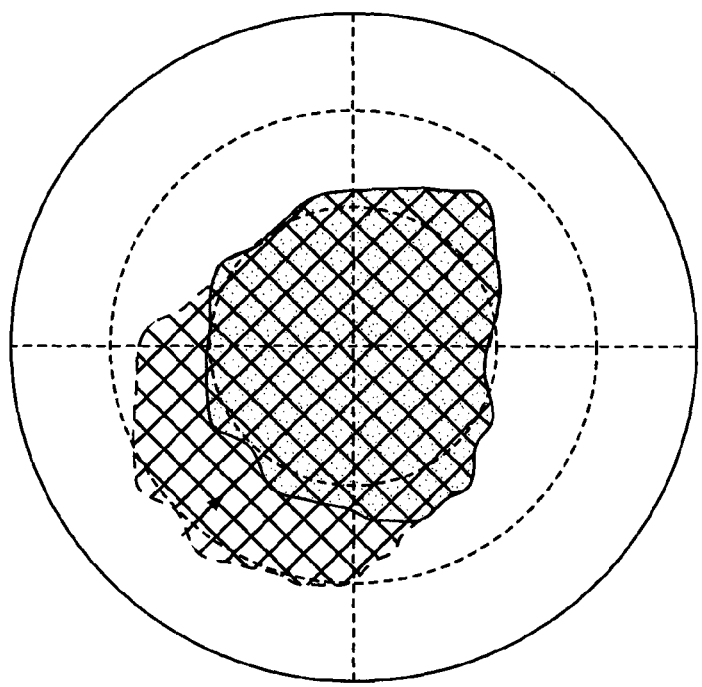
FIG. 8 shows an example tower bottom moment load envelope for an inclined tower according to many of the embodiments of the present invention.

By inclining the tower of the wind turbine into the predominant winds the offset of the moment loads and/or fatigue loads on the tower bottom can be minimized. As shown in FIG. 8, when the tower is inclined or tilted into the predominant wind direction the tower bottom moment load envelope can be centered meaning that the extreme moment loads and/or fatigue loads can be reduced. This advantageously enables the tower structure to be manufactured with less strength and material leading to a reduction in the cost of the tower. Similarly, by inclining the tower into the predominant wind the effective moment loads and/or fatigue loads are reduced and so the tower is able to cope with larger moment loads and/or fatigue loads than previously, meaning the wind turbine could be erected in wind conditions that the tower previously was not sufficiently strong enough to handle.

As the tower is inclined or tilted towards one direction, then if strong winds from another direction are encountered the wind turbine can be controlled to de-rate the wind turbine to protect the wind turbine from excessive loads.

As well as taking into account the wind rose analysis to determine the value of the predetermined tilt angle for the inclination and the direction of inclination for the tower, the analysis may further take into account the wind turbulence, air pressure, temperatures, or any other wind condition.

In a further embodiment, in order to reduce the moments on the tower 102, the wind turbine may take advantage of gravity to counteract the thrust force on the wind turbine, thereby reducing the moments (e.g. moment loads) and/or fatigue loads on the tower.

In this example, the tower may be attached or operatively connected to a device that enables the wind turbine to rotate or tilt about one or more axis. By enabling the tower to rotate or tilt around one or more axis, the wind turbine is able to tilt or lean into the wind such that the forces of gravity and the thrust force on the wind turbine are in equilibrium, or balanced. In other words, the wind turbine tilts or leans into the wind using gravity and is held or prevented from falling over by the thrust force acting on the wind turbine. As such, the stress and/or loads on the tower may be reduced by balancing the centre of mass of the wind turbine against the force of the wind. As discussed hereinabove, by reducing the stress or loads on the tower then the tower may be designed and manufactured with less material and strength thereby reducing the cost of the tower and hence the cost of the wind turbine.

The device may be any device that enables the wind turbine to tilt, for example, the device may be a hinge, a ball socket, a platform, flexible material, spring, or any other suitable device.

Figure 2:
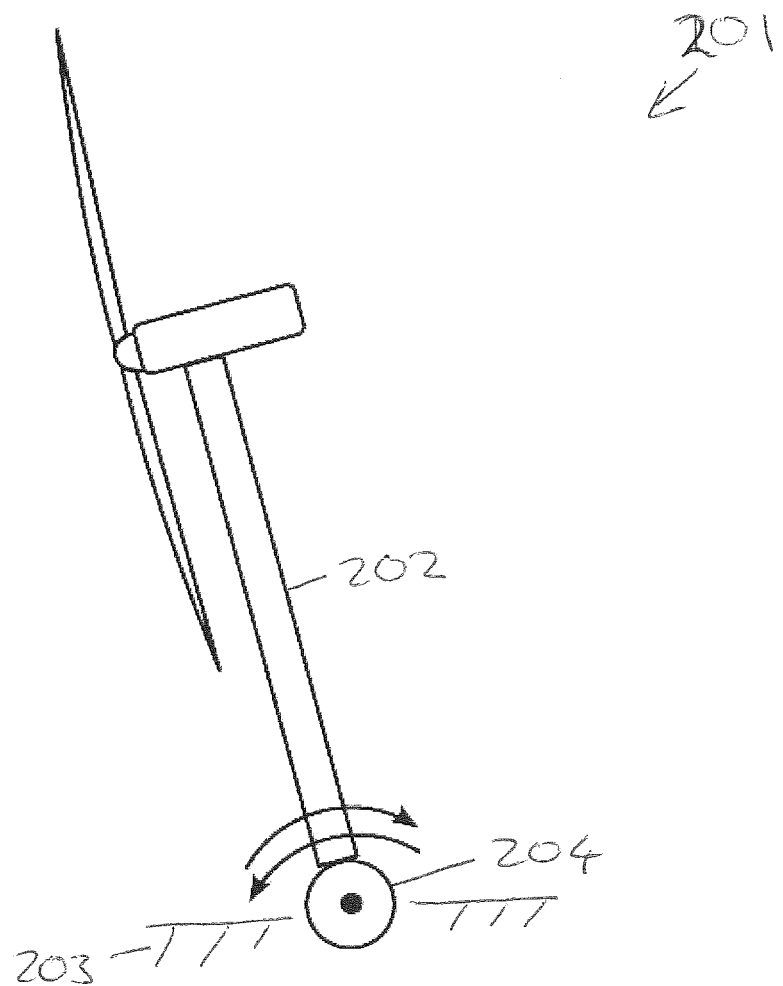
FIG. 2 shows a simplified diagram of a tilting wind turbine according to many of the embodiments of the present invention.

In an example, shown in FIG. 2, the wind turbine 201 comprises a tower 202 that is connected to the foundations 203 via a hinge 204. The hinge 204 in this example enables the wind turbine 201 to tilt forwards and backwards in the fore-aft direction. Thus, in this example the tower is able to rotate or tilt around one axis.

In order to be able to utilize a hinged wind turbine, the control of the wind turbine is a challenging and important aspect of the example and embodiments. The wind turbine is able to rotate or tilt about one or more axis and therefore it is essential to be able to control the wind turbine such that it does not rotate or tilt too far and effectively fall over. The wind turbine needs to be controlled such that the gravity force and the thrust force acting on the wind turbine are substantially balanced or in equilibrium. As will be appreciated, the wind varies and is not consistent and as such the wind turbine needs to be controlled to stabilize the wind turbine and maintain the balance or equilibrium as the thrust force acting on the wind turbine may vary.

A wind turbine typically comprises mechanisms to alter or change the operating parameters of the wind turbine. For example, a wind turbine is able to alter the pitch of the turbine blades via a pitch control system, generator torque can be altered or changed by a generator torque controller and the nacelle is able to yaw via a yaw control system. The wind turbine may include other mechanisms for altering operating parameters of the wind turbine.

The control of the wind turbine may be based on, at least, the wind speed at the wind turbine and/or upstream of the wind turbine. The wind speed may be determined or estimated from sensors such as Light Detecting and Ranging (LiDAR) device, an anemometer sensor, and so on, located at or separate to the wind turbine. The wind speed may alternatively be inferred or estimated based on, for example, electrical power being generated, pitch angle of the turbine blades, and so on.

In order to control the wind turbine in the embodiments of the present invention, a controller alters the operating parameter(s) of the wind turbine so as to maintain the stability of the wind turbine and keep the wind turbine in equilibrium or balanced between the thrust force and gravity. The controller may determine a tilt angle for the wind turbine and alter (or initiate altering of) the operating parameters of the wind turbine based on the determined tilt angle. The tilt angle may be determined from a lookup table based on, for example, the wind speed, or the controller may calculate the tilt angle in real-time based on, for example, the wind speed.

Once the required tilt angle has been determined the controller may initiate a change in the operating parameters so that the wind turbine tilts to the required tilt angle or is maintained at the desired tilt angle. For example, the controller may determine a pitch angle for the turbine blades, either individually or collectively, and initiate via a pitch control system the change in pitch angle of the turbine blades. The controller may determine a generator torque and/or rotor torque and initiate altering the respective torque.

The controller may determine or identify the current tilt angle of the wind turbine. The controller may track the tilt angle of the wind turbine and keep a log of the tilt angle of the wind turbine. The controller may determine the current tilt angle of the wind turbine based on, for example, sensors in the wind turbine, in particular in the nacelle. The sensors may include inclinometers, accelerometers or any other sensors suitable for determining the tilt angle of the wind turbine. Alternatively, or additionally, there may be sensors separate to the wind turbine that can identify the current tilt angle of the wind turbine and provide the controller with the current tilt angle of the wind turbine.

If the current tilt angle is known, then the controller may further determine a difference between the current tilt angle and the required tilt angle. The operating parameters can then be altered to ensure that the wind turbine moves from the current tilt angle to the required tilt angle and/or be maintained at the required tilt angle.

It may also be necessary to consider the control of the wind turbine during the operation of the wind turbine. In particular, it may be considered that in operation the wind turbine traverses through three operating regions during which the control of the wind turbine may vary.

The first region is where the wind turbine is subject to low wind speeds, below the so called rated wind speed for the wind turbine design. In this low wind speed region the power output or generated by the wind turbine should be maximized whilst maintaining the stability of the hinged wind turbine.

The second region is a transition region between the low wind speed region and the rated wind speed region. In the transition region the wind speed increases from below rated to rated or above rated wind speeds.

The third region is the above rated wind speed region where the power output or generated should be limited to the rated power for the design of wind turbine.

In the first region, the wind turbine is controlled to maximize the generated power output and to keep the wind turbine stable, in other words maintain the balance or equilibrium between the thrust force and gravity. In the first region the wind speed increases from the cut-in speed through to approximately the rated wind speed for the given wind turbine. In order to maximize the electrical power generated the pitch angle of the blades may be kept substantially at 0 degrees. The rotor speed is proportional to the wind speed and so as the wind speed increases so does the rotor speed of the wind turbine. The generator torque thus increases proportional to the square of the rotor speed.

Accordingly, as the wind speed increases and therefore the rotor speed also increases in this first region, the thrust force acting on the wind turbine also increases. The required tilt angle is determined by the controller (e.g. from a lookup table, calculated in real-time, etc.) and the wind turbine is controlled by altering operating parameters to obtain or maintain the wind turbine at the required angle. In this first region the controller may alter the generator torque and/or the pitch angle of the turbine blades in order to obtain or maintain the required tilt angle.

In the second region, the wind speeds are approaching and substantially close to the rated wind speed for the given wind turbine. This region is considered as the transition between below rated wind speeds and rated (and above) wind speeds. During this region the operation of the wind turbine and the operating points change from a focus on generating the maximum possible electrical power output to maintaining the maximum possible electrical power output for a given wind turbine.

In the second region, the controller again determines the required tilt angle of the wind turbine and alters or initiates a change to the operating parameters of the wind turbine. For example, the controller may increase the pitch angle of the turbine blades in order to obtain or maintain the required tilt angle such that the wind turbine can be stably maintained in equilibrium between the thrust force acting on the wind turbine and gravity. However, the increase in pitch angle means that the wind turbine is no longer generating the maximum permissible electrical power output and therefore the size of the second region should be minimized. The controller may also alter the generator torque and/or the yaw of the nacelle or alter any other operating parameter of the wind turbine in order to obtain or maintain the required or determined tilt angle.

In the third region, where the wind speeds are at or above rated wind speeds, the wind turbine is controlled to maintain the electrical power output at the maximum permissible. Typically, the controller increases the pitch angle of the turbine blades as the wind speed increases to keep the rotor speed constant at the maximum permissible, which keeps the generator torque constant so that a constant electrical power output is maintained. During this region, the required tilt angle is determined and the operating parameters of the wind turbine are altered in order to obtain or maintain the required determined tilt angle by, for example, increasing the pitch angle of the turbine blades.

Accordingly, the example described hereinabove shows that a hinged turbine can be controlled to maintain the stability of the wind turbine and enable the thrust force acting on the wind turbine to be balanced by gravity also acting on the wind turbine. The controller may utilize the generator torque controller and/or the pitch control system to regulate the tilt angle of the wind turbine.

In the above example, the wind turbine included a hinge between the tower and the foundations to enable the wind turbine to tilt or lean in the forward and backwards directions, in other words rotate around one axis. However, the tower base may be subject to moments, forces, loads or stress in other directions and around further axis such as sideways. As such, it may be further beneficial to allow the wind turbine to rotate or tilt around more than one axis so as to reduce the moments on the tower meaning that the cost of the tower can be further reduced.

Figure 3:
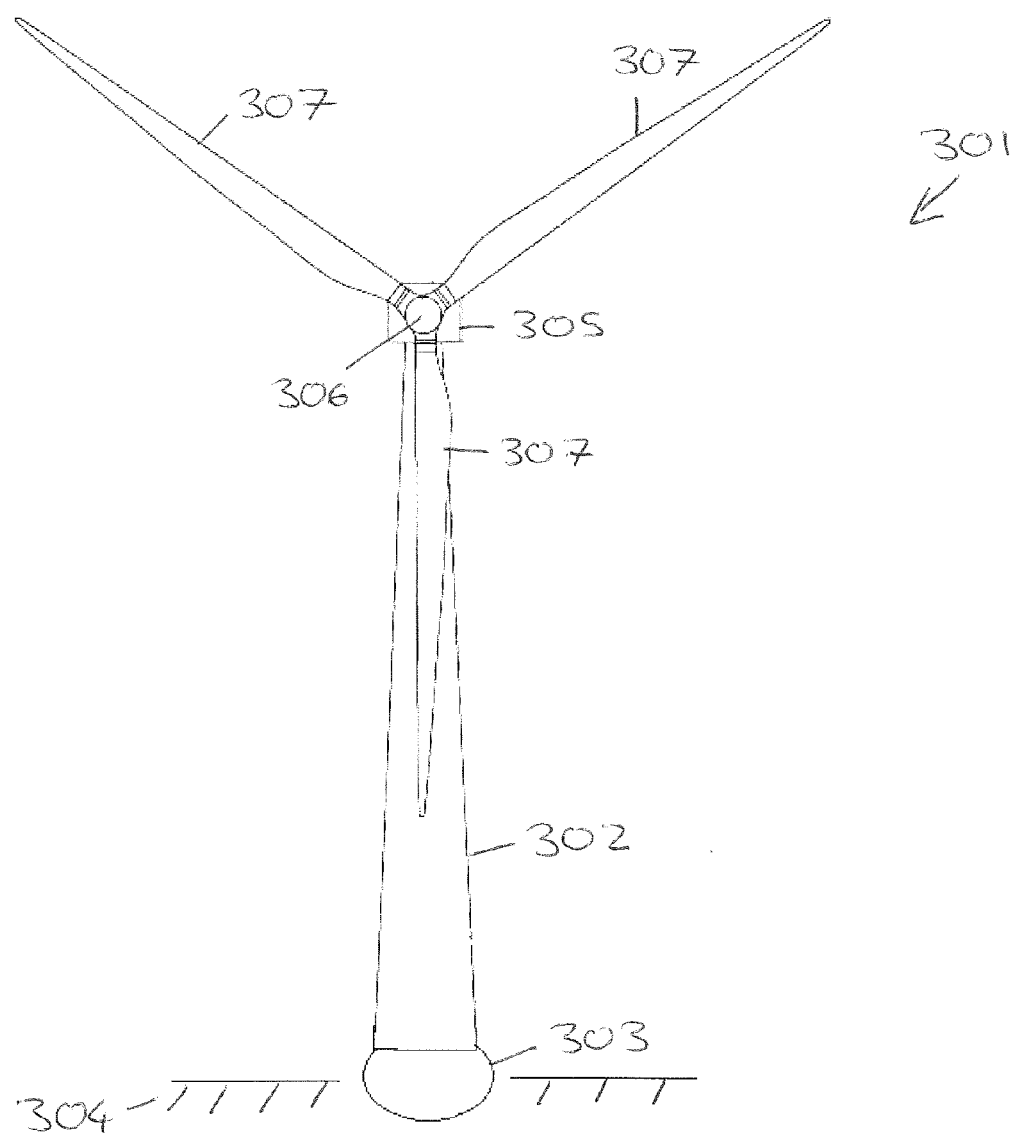
FIG. 3 shows a simplified diagram of a tilting wind turbine according to many of the embodiments of the present invention.

In the following example, explained with reference to FIG. 3, the wind turbine 301 includes a tower 302, a ball joint 303 connecting the tower to the foundations 304. A nacelle 305 is attached to the tower 302 and the rotor 306 is attached to the nacelle 305 where one or more turbine blades 307 are attached to the rotor 306.

The ball joint 303 allows the wind turbine to be able to rotate in multiple axes. Instead of a ball joint 303 any other device to allow the turbine to rotate around more than one axis may be utilized, for example, a spring, two or more hinges, a hinge that can operate in more than one axis, and so on.

Thus, in addition to the first example (where the controller altered the operating parameters of the wind turbine to tilt the wind turbine to maintain balance or equilibrium between the thrust force acting on the wind turbine and gravity in the forwards and backwards direction), the controller may further control the sideways tilt or rotation by altering the rotor torque and/or generator torque. The generator torque may translate via the nacelle frame into sideways motion of the tower that can be used to balance the tower sideways. Furthermore, in combination with the control of the pitch angle it may be used to balance the wind turbine against the thrust force in multiple directions. Alternatively, or additionally the controller may further change or alter the yaw of the nacelle via a yaw control system in order to obtain the required tilt in the multiple directions around the axis of rotation of the hinge device.

In the examples and embodiments described hereinabove, the wind turbine operating parameters are altered or changed in order to tilt the wind turbine such that the thrust force and gravity acting on the wind turbine are balanced. The tilt angle required for the wind turbine may be determined from a look-up table based on one or more of the determined thrust force acting on the wind turbine, rotor speed, pitch angle of the turbine blades, generator torque, wind speed (actual or estimated), wind shear (actual or estimated) and wind direction. The tilt angle required may alternatively or additionally be calculated or determined in real-time.

The controller may initiate the respective or corresponding systems depending on the operating parameter than needs to be altered or changed to maintain the balance between the thrust force and gravity. For example, the pitch control system to alter the pitch angle of the turbine blades.

The tilt angle of the wind turbine may be tracked or identified so that the difference between the current tilt angle and the required tilt angle may be determined. The operating parameters of the wind turbine may then be altered by an amount necessary to reach the desired tilt angle from the current tilt angle. Similarly, the difference between the current tilt angle and the required tilt angle may be converted into or determined as a difference in operating parameters, e.g. the difference between the current pitch angle of the turbine blades and the pitch angle required. For example, if the determined tilt angle is, say, 4 degrees from the vertical in the forward direction, then the current tilt angle may be monitored, tracked or measured so that the operating parameters may be altered in order to maintain the wind turbine at the 4 degrees in this example.

Thus, the controller may track and maintain a record of the tilt angles. The controller may also track or log thrust forces, pitch angles, generator torque, rotor torque, wind speeds, wind shear, and so on, so as to be able to maintain the wind turbine at the determined or required tilt angle.

The controller may also take into account when determining the change to the operating parameters to tilt the wind turbine to the appropriate tilt angle the performance of the wind turbine. Therefore, the controller may further base the determination of the tilt angle and/or the alteration to the operating parameters on the conditions affecting the wind turbine and/or on the operating conditions of the wind turbine and/or on the required electrical power output. In other words, more than one tilt angle may be suitable for balancing the wind turbine between the thrust force and gravity and therefore the controller may determine the tilt angle that provides the best or optimal electrical power generation or other factors for the wind turbine. As such, in determining the tilt angle and or the change in the operating parameters of the wind turbine the controller may take into account the optimal conditions for the wind turbine.

The embodiments and examples described hereinabove may further include a supervisor to increase the stability of the wind turbine. The wind turbine may fall over if it loses the balance between the thrust force and gravity. A sudden drop in wind speed means a drop in the thrust force acting on the wind turbine. The controller attempts to compensate for the drop in wind speed by decreasing the pitch angle of the turbine blades to increase the thrust force acting on the wind turbine. However, it may be beneficial to ensure that the control of the wind turbine does not make the wind turbine oscillate forwards and backwards (or in any other direction around the axes of rotation). Therefore, a supervisor may be implemented in order to supervise the control of the wind turbine to prevent the wind turbine from oscillating or tilting too far in any one direction and to increase the stability of the wind turbine. The supervisor may, for example, limit the pitch angle of the turbine blades, may limit the rotor torque and/or generator torque.

Accordingly, in the above examples, the wind turbine can be controlled to tilt or rotate in the forwards/backwards direction and/or in the sideways direction. The wind turbine may be controlled independently in those directions or the control of the wind turbine may be combined so as to be able to control the wind turbine not only in the forwards/backwards direction and/or the sideways direction but in more directions such as the diagonal.

The controller may constantly determine the required tilt angle and alter the operating parameters accordingly. Alternatively, the controller may determine the required tilt angle at a suitable frequency or time period for the purpose of the invention so as to keep the wind turbine balanced.

In the period between subsequent determinations of the required tilt angle the controller may control or operate the wind turbine such that it maintains the last determined tilt angle. Therefore, the controller may monitor or track the current tilt angle of the wind turbine and may alter the operating parameters of the wind turbine if the current tilt angle varies from the last determined tilt angle and before a new tilt angle is determined in order to maintain the wind turbine at the last determined tilt angle.

In the above examples and embodiments, the controller may further alter the operating parameters of the wind turbine to effectively turn or operate the wind turbine as a fan. In particular, the wind turbine may be controlled into a motor mode such that it can be utilized to further increase the stability of the wind turbine. The generator torque can be bi-directional and have both positive and negative torque. In the motor mode the wind turbine may consume electrical power rather than generate electrical power but the motor mode may be useful to maneuver the wind turbine to the required tilt angle or be used as an aid to prevent the wind turbine from falling over or as an aid to stabilize the wind turbine.

The controller may determine or calculate the thrust force acting on the wind turbine via a variety of means and sensors. For example, the thrust force may be determined based on the pitch angle of the turbine blades, the rotor speed and the wind speed. As the wind speed varies then the effect of the thrust force acting on the wind turbine may also vary.

Also, changes to the pitch angle may affect or alter the effect of the thrust force on the wind turbine.

Accordingly, the above examples and embodiments show that a wind turbine can be controlled so as to tilt or rotate such that the wind turbine can be stably held in balance between the thrust force and gravity acting on the wind turbine.

In order to enable the wind turbine to be controlled in this manner the wind turbine needs to be able to rotate or tilt around one or more axis. The tower of the wind turbine is operatively connected to a device that enables the wind turbine to rotate or tilt around one or more axis. For example, the device may be a one axis hinge, a two or more axis hinge, a ball joint, a spring, a platform, a flexible tower, a cable and pulley system, or any other device that enables the wind turbine to rotate or tilt around one or more axis.

If the device is a platform (e.g. a floating platform or an onshore platform) the controller may further alter or initiate the altering of the platform as one of the operating parameters of the wind turbine, either independently or in combination with the other operating parameters described hereinabove. For example, if the platform includes hydraulic pistons then the controller may control or initiate the control of the hydraulic platform to tilt the wind turbine.

As shown in FIG. 5, the degree of freedom to rotate or tilt may be provided by a floating platform.

Figure 5A:
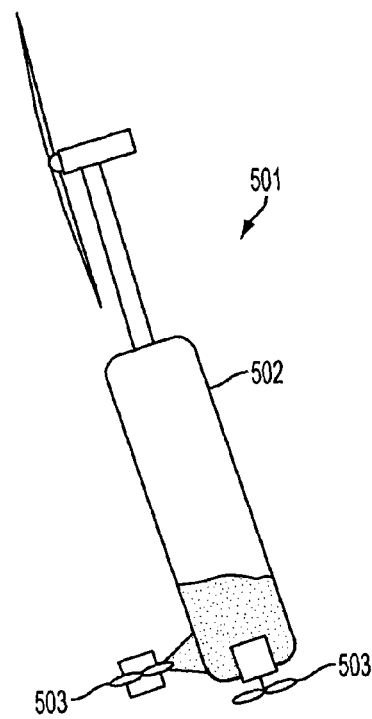
FIG. 5 shows a simplified diagram of a tilting floating wind turbine according to many of the embodiments of the present invention.

FIG. 5a shows a wind turbine 501 mounted on a single buoy type floating platform 502. In this example, the buoy floating platform includes two propellers 503 that can be used to move and tilt the wind turbine 501.

Figure 5B:
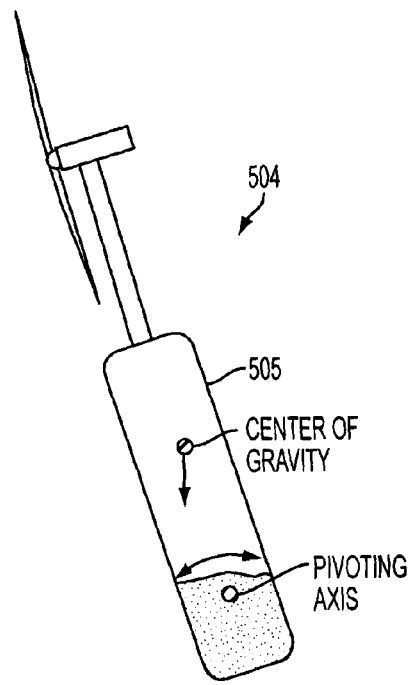

FIG. 5b shows a wind turbine 504 mounted on a single buoy floating platform 505 where the ballast, in this example water, may be pumped in or drained out in order to change the tilt angle of the wind turbine 504. As will be appreciated, the active ballast system may incorporate a closed system with different chambers in order to control the tilt of the wind turbine. The ballast system may be an open ballast system using the water from body of water in which the buoy platform is located.

Also, in FIG. 5, the floating platform is shown as a single buoy type platform however, as will be appreciated there may be any number of buoys or the wind turbine may be mounted on a platform supported by two or more ballast tanks where ballast may be actively moved between the ballast tanks in order to tilt the wind turbine.

The wind turbine may combine devices in order to control the rotation or tilt of the wind turbine and to stably maintain the balance between the thrust force and gravity acting on the wind turbine. For example, the wind turbine may include a hinge that operatively connects the tower of the wind turbine to a platform.

The wind turbine may also include one or more safety devices as shown in FIG. 4.

Figure 4A:
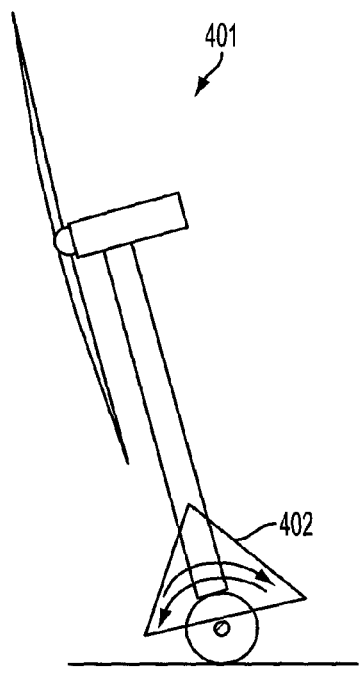
FIG. 4 shows a series of safety devices for a hinged wind turbine according to many of the embodiments of the present invention.

For example, FIG. 4a shows a hinged wind turbine 401 that includes a mechanical skirt 402. In FIG. 4a, the mechanical skirt 402 is a triangular or pyramid shape, however, as will be appreciated the mechanical skirt 402 may be any suitable shape. The mechanical skirt 402 may be a frame or a solid skirt or a combination thereof. In this example, the mechanical skirt 402 is able to rotate around the connection to the tower of the wind turbine 401 or may be fixed to the wind turbine 401 such that the wind turbine is not impeded as it tilts or leans to an angle lower than a predefined limit. If the wind turbine 401 attempts to lean or tilt greater than the predefined limit then the mechanical skirt 402 becomes in contact with the ground preventing the wind turbine from leaning or tilting greater than the predefined limit thereby preventing the wind turbine from falling over.

Figure 4B:
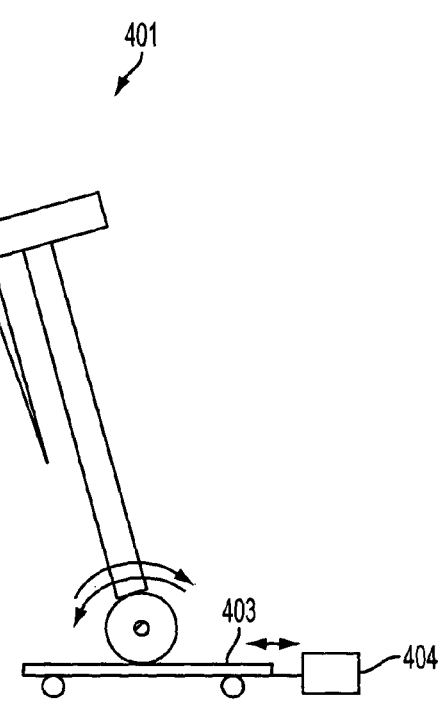

Another example is shown in FIG. 4b, where the hinged wind turbine 401 is attached to a sliding platform 403. The sliding platform 403 may be operatively connected to a pulley system 404 or similar device that is able to slide the sliding platform 403 backwards and forwards or in any other direction. Therefore, if the wind turbine 401 leans or tilts greater than a predefined limit then the sliding platform 403 may be activated via the pulley system 404 to prevent the wind turbine from falling over.

Figure 4C:
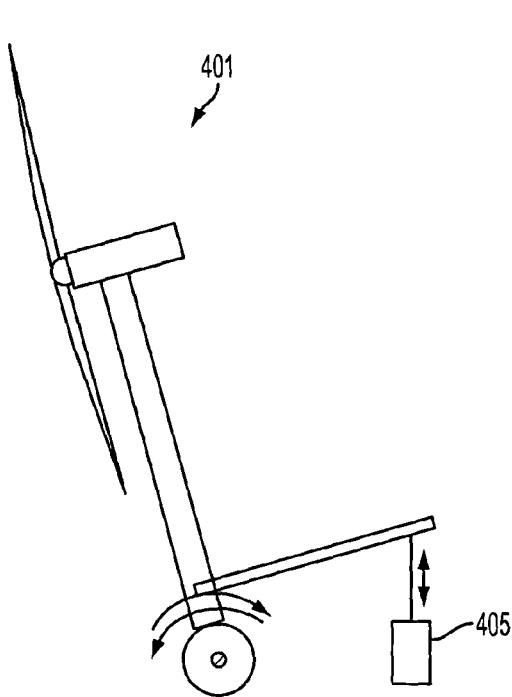

FIG. 4c shows a further example in which the hinged wind turbine 401 is connected to a pulley system 405 such that if the wind turbine leans or tilts greater than a predefined limit then the pulley system 405 may be activated to pull or push, in one or more directions, to prevent the wind turbine from falling over or going past the predefined tilt angle. The pulley system 405 may be a hydraulic system, a cable system or any other pulley system suitable for use as the safety system.

Figure 4D:
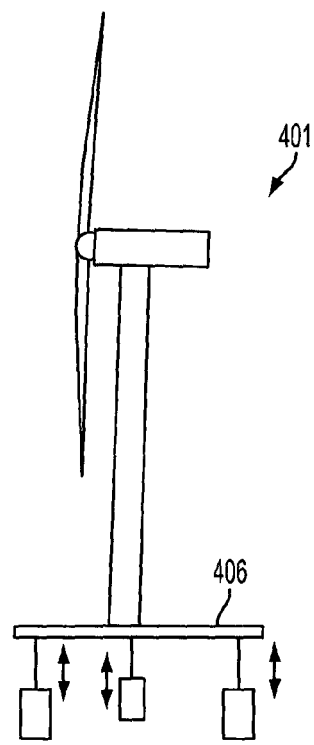

In FIG. 4d, the hinged wind turbine 401 is connected to a platform 406 which is supported by a tripod of hydraulic pistons or columns. Therefore, if the wind turbine 401 leans or tilts greater than a predefined limit then the tripod 406 can be activated such that the wind turbine 401 is prevented from falling over or tilting greater than the predefined limit.

Figure 4E:
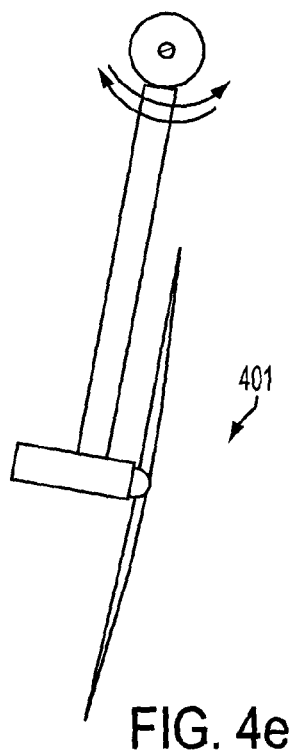

Another example is shown in FIG. 4e in which the hinged wind turbine 401 is hanging upside down. The hinged wind turbine 401 may be connected to a frame and by hanging upside down it will be prevented from falling over.

Figure 4F:
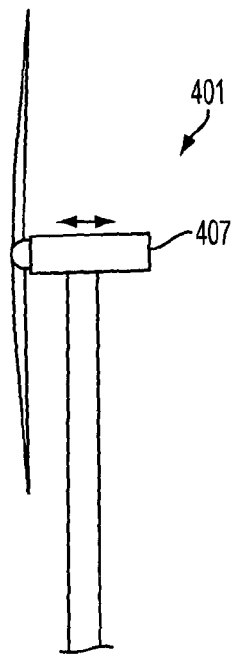

In FIG. 4f, the hinged wind turbine 401 includes a moveable nacelle 407 such that if the wind turbine attempts to tilt greater than a predefined limit then the nacelle 407 may be moved to counter the tilt and prevent the wind turbine 401 from falling over.

Figure 4G:
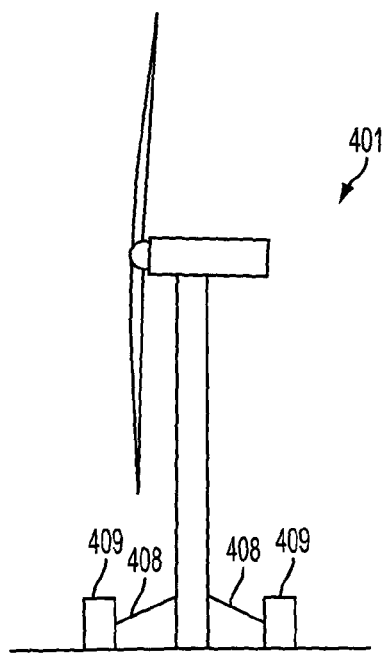

In FIG. 4g, the hinged wind turbine 401 is connected to two or more cables 408 which can be extended or retracted via, for example, a pulley system 409. Therefore, whilst the wind turbine is within the predefined tilt angle limit the wind turbine is able to tilt however the cables 408 and pulley system 409 can be utilized to prevent the wind turbine 401 from tilting further than the predefined limit.

Figure 4H:
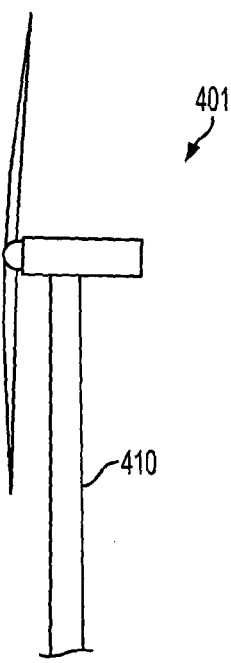

In FIG. 4h, the nacelle of the wind turbine is mounted on a flexible tower 410 that is able to bend or move. The amount of flexibility and elasticity means that the wind turbine is unable to fall over but provides enough freedom to tilt or rotate. The flexible tower may be the device that enables the wind turbine to tilt.

In FIG. 4, several designs of wind turbines are shown that enable the wind turbine to tilt or rotate around one or more axis and also show one or more safety devices that may prevent the wind turbine from falling over. One or more of the safety devices may be combined with one or more of the wind turbine designs shown or described hereinabove.

In conventional fixed wind turbines the most stress comes from the moment at the base of the tower due to the thrust forces acting on the tower from the wind. Advantageously, the wind turbine that is able to rotate or tilt around one or more axis the stress caused by the moment at the base of the tower is effectively and substantially negated. Accordingly, implementing a hinge (or similar device) provides a significant reduction in the moment stress on the tower which enables the tower to be designed with a smaller diameter as the loads and stresses acting on the tower are reduced.

As described herein, the wind acts with a force upon the rotor plane that can be split into two perpendicular components. One component of the force causes the rotor to turn, called the rotor torque, the other component pushes the wind turbine backwards, called the thrust force. The thrust force adds a load on the structure of the wind turbine. The structure must be able to withstand this force, which raises requirements to the strength of the structure and hence the cost. By having a hinge or joint at the bottom of the tower (operatively connecting the tower with the foundation) enables the turbine to lean against the wind. Leaning the turbine allows the gravitational force to act opposite the thrust force, whereby the turbine tower can be relieved from the thrust-induced mechanical stress and reducing the moments in the tower base and/or foundations. The control strategies described herein show that by manipulating the operating parameters of the wind turbine, the tower can be balanced against the wind while maintaining an optimal power production.

In a further example, the fixed inclination examples described hereinabove may be combined with the examples relating to the tower being attached to a device that enables the tower to rotate or tilt around one or more axis. For example, the device may be fixed (e.g. by means of a pin, a brake, or other fixing arrangement) to enable the tower to tilt or incline into the predominant wind that has been determined or identified from the wind rose and analysis of the site.

The wind turbine tower may be held at a fixed inclination for a period of time, or under certain wind conditions and/or operating conditions. At other times or under other wind conditions and/or operating conditions the fixing arrangement may be released enabling the tower to rotate or tilt around one or more axis. By combining the embodiments an efficient and flexible control of the wind turbine may be achieved.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

What is claimed is:

1. A wind turbine comprising:
   a substantially rigid foundation;
   a tower having a base, wherein the tower is supported by the foundation; and
   a device operatively connected between the base and the foundation, wherein the device enables the tower to tilt around one or more axes, and
   wherein, using the device, the tower is inclined from a vertical position during power production to reduce loads on the tower.

2. The wind turbine as claimed in claim 1, in which said tower is inclined to a predetermined tilt angle into a predominant wind direction during power production.

3. The wind turbine as claimed in claim 2, in which said predetermined tilt angle is determined based on an analysis of wind conditions at a location of said wind turbine.

4. The wind turbine as claimed in claim 2, in which said tower is fixedly inclined to said predetermined tilt angle such that said tower is permanently inclined from said vertical position.

5. The wind turbine as claimed in claim 1 in which said device is one or more of a hinge, a platform, a flexible member, a joint, and a ball and socket.

6. The wind turbine as claimed in claim 1 further comprising:
   one or more safety devices, wherein said safety device prevents said wind turbine from tilting further than a predetermined tilt angle.

7. The wind turbine as claimed in claim 1, further comprising:
   a controller adapted to determine a tilt angle for said wind turbine; and
   said controller is further adapted to alter an operating parameter of said wind turbine during power production such that said wind turbine inclines to said determined tilt angle at which said wind turbine is balanced between a thrust force acting on said wind turbine and gravity acting on said wind turbine.

8. The wind turbine as claimed in claim 7 in which said controller is further adapted to identify said tilt angle from a lookup table; or calculate said tilt angle in real time.

9. The wind turbine as claimed in claim 7 in which said controller is further adapted to determine a pitch angle for one or more turbine blades of said wind turbine based on said determined tilt angle; and/or determine a generator torque for a generator of said wind turbine based on said determined tilt angle.

10. The wind turbine as claimed in claim 7, in which said controller is further adapted to:
    identify a current tilt angle of said wind turbine;
    determine a difference between said current tilt angle and said determined tilt angle; and
    alter said operating parameters of said wind turbine based on said determined difference.

11. A method comprising:
    inclining, from a vertical position, a tower of a wind turbine during power production to reduce loads on the tower,
    wherein a base of the tower is supported by a substantially rigid foundation through a device operatively connected between the base and the foundation, wherein the device enables the tower to tilt around one or more axes.

12. The method as claimed in claim 11, further comprising:
    determining a predominant wind direction; and
    inclining said tower by a predetermined tilt angle into said predominant wind direction during power production.

13. The method as claimed in claim 12, further comprising:
    determining said predetermined tilt angle based on an analysis of wind conditions at a location of said wind turbine.

14. The method as claimed in claim 12, in which said tower is fixedly inclined to said predetermined tilt angle such that said tower is permanently inclined from a vertical position.

15. The method as claimed in claim 11, further comprising:
    determining a tilt angle for said wind turbine; and
    altering an operating parameter of said wind turbine during power production such that said wind turbine inclines to said determined tilt angle and said wind turbine is balanced between a thrust force acting on said wind turbine and gravity acting on said wind turbine.

16. The method as claimed in claim 15 in which determining said tilt angle comprises:
    identifying said tilt angle from a lookup table; or
    calculating said tilt angle in real time.

17. The method as claimed in claim 15 in which altering said operating parameter of said wind turbine comprises:
   determining a pitch angle for one or more turbine blades of said wind turbine based on said determined tilt angle; and/or
   determining a generator torque for a generator of said wind turbine based on said determined tilt angle.

18. The method as claimed in claim 15 further comprising:
   identifying a current tilt angle of said wind turbine;
   determining a difference between said current tilt angle and said determined tilt angle; and
   said altering of said operating parameters of said wind turbine is based on said determined difference.

* * * * *